United States Patent [19]

Welch

[11] Patent Number: 4,831,333

[45] Date of Patent: May 16, 1989

[54] LASER BEAM STEERING APPARATUS

[75] Inventor: Albert B. Welch, Dallas, Tex.

[73] Assignee: LTV Aerospace & Defense Co., Dallas, Tex.

[21] Appl. No.: 906,226

[22] Filed: Sep. 11, 1986

[51] Int. Cl.[4] .................. H01S 3/00; H01S 3/098; G01S 7/42

[52] U.S. Cl. .................. 330/4.3; 307/425; 372/21; 372/33; 372/99

[58] Field of Search ............ 330/4.3; 332/7.51; 350/3.64; 307/425; 372/18, 19, 21, 33, 99, 101; 356/5

[56] References Cited

U.S. PATENT DOCUMENTS

| | | | |
|---|---|---|---|
| 3,566,126 | 2/1971 | Lang | 250/199 |
| 3,727,223 | 4/1973 | O'Meara | 332/7.51 |
| 3,968,456 | 7/1976 | Welch | 331/94.5 C |
| 4,096,448 | 6/1978 | Hayes | 372/18 |
| 4,166,274 | 8/1979 | Reudenk et al. | 342/376 |
| 4,198,162 | 4/1980 | Bjorklund et al. | 356/349 |
| 4,233,571 | 11/1980 | Wang | 331/94.5 C |
| 4,321,550 | 3/1982 | Entuban | 372/9 |
| 4,429,393 | 1/1984 | Giuliano | 372/21 |
| 4,493,085 | 1/1985 | Valley | 372/19 |
| 4,493,086 | 1/1985 | Jain et al. | 372/21 |
| 4,498,184 | 2/1985 | O'Meara | 372/92 |
| 4,500,855 | 2/1985 | Feinberg | 332/7.51 |
| 4,508,431 | 4/1985 | Henshaw | 350/354 |
| 4,513,424 | 4/1985 | Welch | 372/24 |
| 4,515,471 | 5/1985 | Eden | 356/5 |
| 4,515,472 | 5/1985 | Welch | 356/5 |
| 4,528,525 | 7/1985 | Eden et al. | 332/7.51 |
| 4,529,273 | 7/1985 | Cronin-Golomb et al. | 350/354 |
| 4,648,092 | 3/1987 | Eubank et al. | 372/18 |
| 4,674,824 | 6/1987 | Goodman et al. | 350/3.64 |

OTHER PUBLICATIONS

Rockwell et al, "Coherent Coupling of Laser ... Conjugation", Opt. Lett., vol. 11, pp. 147-149, 3/86.
Manishin et al, "Problem of Suppression ... Mirrors", Sov. J. Quant. Elect., vol. 14, #6, 6/84.
Basov et al, "Influence of Certain ... Mirror", Sov. J. Quant. Elect., vol. 9, #4, 4/79.
Linford et al., "Very Long Lasers", Applied Optics, vol. 13, No. 2, Feb. 1974.
D. R. Matthys & E. T. Jaynes, "Phase-Sensitive Optical Amplifier", J. Opt. Soc. Am., vol. 70, No. 3, Mar. 1980.
Jack Feinberg & R. W. Hellwarth, "Phase-Conjugating Mirror with Continuous Wave Gain", Optic Letters, vol. 5, No. 12, Dec. 1980.
Concetto R. Giuliano, "Applications of Optical Phase Conjugation", Physics Today, Apr. 1981.
"Phase Conjugation with Barium Titanate", Laser Focus, Dec. 1981.
C. R. Giuliano et al., "Can Phase Conjugate Resonators Enhance Laser Performance?", Laser Focus, Feb. 1983.

Primary Examiner—Nelson Moskowitz

[57] ABSTRACT

A device for steering a wavefront of electromagnetic radiation comprising a pumping means for coherently pumping a plurality of phase conjugate mirrors with a monochromatic coherent beam having a wavelength substantially the same as the wavelength of the wavefront. The device further comprises an array of phase conjugate mirrors wherein the acceptance of each phase conjugate mirror, for conjugate reflection of the wavefront, is pointing in substantially the same direction, and the phase conjugate mirrors are composed of material responsive to the beam wavelength. The device further comprises a Fourier transform lens, a control reflector positioned such that the reflected beam from the reflector back to the lens is within the acceptance angle of the ray, and a beam splitter positioned between the array and the control reflector for extracting a steered beam. Each phase conjugate mirror may provide amplification of the wavefront, or amplifying lasers may be used. The phase conjugate mirrors may be positioned close to each other, or telescopes may be used in conjunction with each phase conjugate mirror to expand each beam.

15 Claims, 3 Drawing Sheets

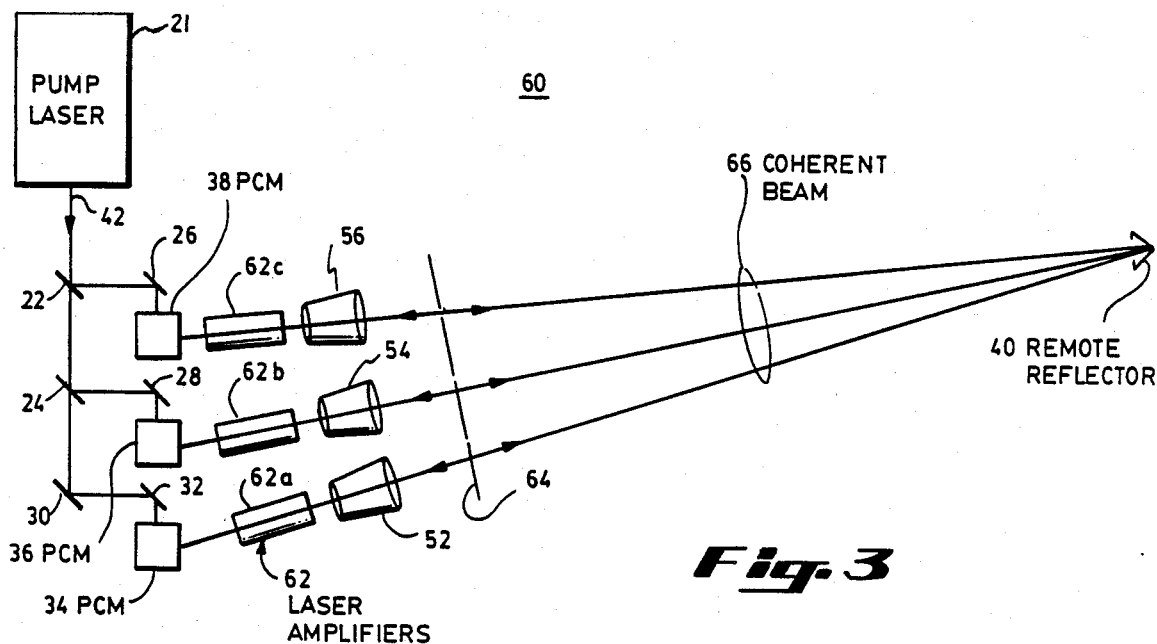
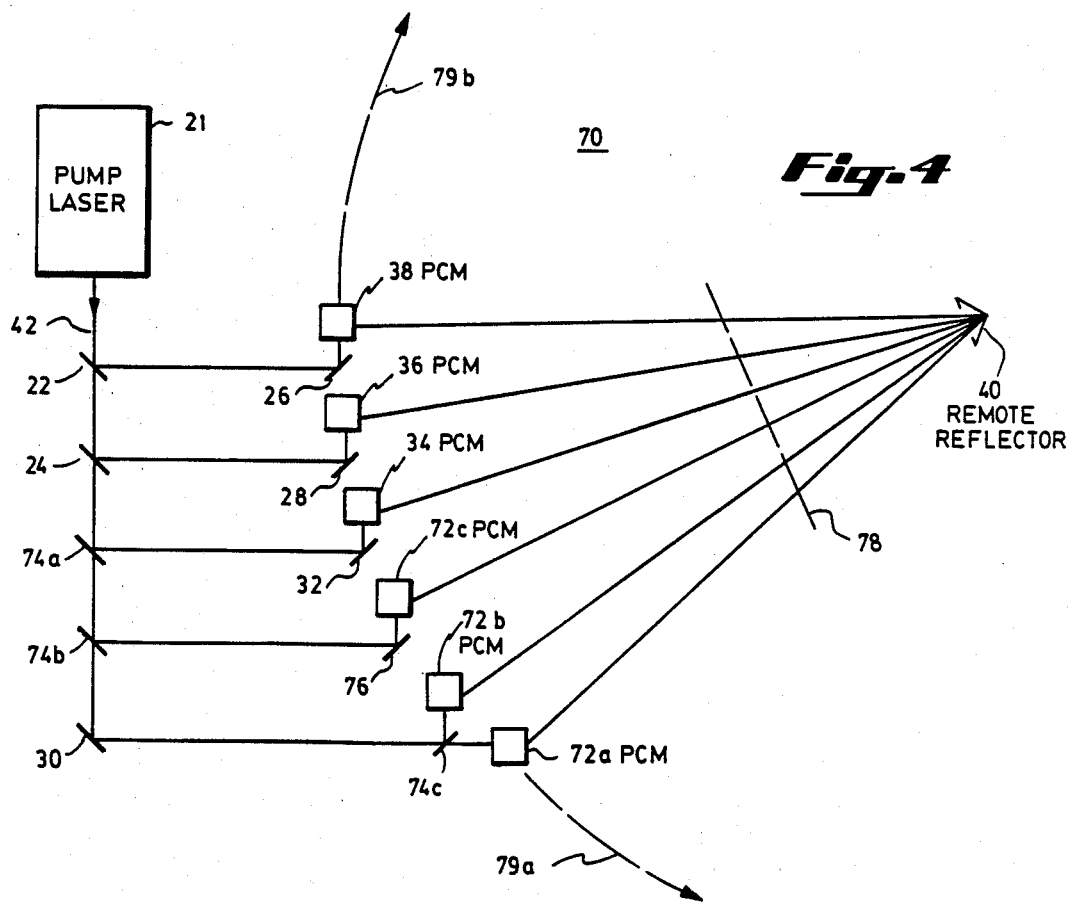

LASER BEAM STEERING APPARATUS

BACKGROUND OF THE INVENTION

1. Field of the Invention

The present invention relates to phased arrays. The book INTRODUCTION TO RADAR SYSTEMS by Merrill Ivan Skolnik, copyright 1980 by McGraw-Hill, and in particular, Chapter 8, discusses the principles of the phased array. That book is incorporated herein by reference. Using a phased array, multiple radiation beams may be coherently combined to provide a beam width narrower than that of a single such radiation beam, being equivalent to that which could be achieved with a single aperture of equal total area. Furthermore, the resulting beam direction may be controlled by the relative phase between the multiple beams.

The present invention also relates to the use of phase conjugate mirrors with lasers to compensate for wavefront distortions within a laser system.

2. Description of the Related Art

Phase conjugation is the production of a light beam that is the time-reversed version of the incident beam. U.S. Pat. No. 4,529,273, to Cronin-Golomb et al., incorporated herein by reference, discloses the use of a self-pumped phase conjugate mirror as an end mirror in a laser resonator for correction of intracavity phase distortion. U.S. Pat. No. 4,500,855 to Feinberg, incorporated herein by reference, also discloses a phase conjugator which does not require external pumping or external mirrors. U.S. Pat. No. 4,515,471 to Eden, U.S. Pat. No. 4,528,525 to Eden et al. and U.S. Pat. No. 4,515,472 to Welch (all three patents are incorporated herein by reference) disclose a steerable laser beam for use in an optical radar system. U.S. Pat. No 4,513,421 to Welch, incorporated herein by reference, discloses using a control reflector in the generation of a scanning laser beam. U.S. Pat. No. 4,508,431 to Henshaw, incorporated herein by reference, discloses using a photo-refractive device for steering a laser beam which passes through the device. In the article "Phase-Locking Lasers with Phase Conjugation" by Feinberg and Bacher, in APPLIED PHYSICS LETTERS 48(9), March 1986, incorporated herein by reference, the authors disclose a self-adjusting resonator, and disclose that two lasers may be automatically phase-locked to achieve a single output that coherently combines the power of two or more lasers.

A problem common to prior art scanning lasers is that the product of the scan angle (also called the agile field-of-view) and the diameter of the collimated beam is a constant regardless of telescope magnification. That is, the wider the aperture of the telescope objective, the smaller the external scan angle, and conversely, the wider the scan angle, the smaller the aperture. None of the prior art discloses using the relative phase across the aperture of each element in an array of a relatively small number of elements to steer a beam of large diameter over a wide scan angle.

In a usual phased array, each element emits a wavefront of small radius which, when summed at a large distance, produces by constructive interference a narrow beam. Because there is no steering of the wavefronts of the individual elements, the angle through which the resulting beam can be steered is limited to that which produces only a fraction of a wavelength change in phase between adjacent elements. Hence the number of resolvable, non-overlapping beam positions is a number limited by, and generally less than, the number of array elements. Thus, there is a need in the prior art for a scanning laser having a wide aperture and having a wide angle of scanning.

SUMMARY OF THE INVENTION

The above-noted and other drawbacks of the prior art are overcome by providing a method and apparatus for steering a wavefront of electromagnetic radiation which features the capability of responding to electromagnetic radiation of any dimension and which can steer a beam of electromagnetic radiation throughout any desired angle. The undesirable feature common to prior art devices wherein the product of the scan angle and the aperture remain constant is overcome by the invention, and it is believed to be the first wide aperture device which can achieve wide angle scanning.

The present invention comprises a system which has a pump for coherently pumping a plurality of phase conjugate mirrors with a monochromatic coherent beam having a wavelength substantially the same as the wavelength of the wavefront incident to the phase conjugate mirrors. Each phase conjugate mirror in the array of phase conjugate mirrors provides amplification of the wavefront upon reflection of the wavefront. The phase conjugate mirrors are positioned as close as possible to each other, with only enough spacing between the mirrors to allow the beam from the pump to enter and fill each phase conjugate mirror. The acceptance angle of each phase conjugate mirror, for conjugate reflection of the wavefront, is pointing in substantially the same direction. The phase conjugate mirrors are composed of material responsive to the beam wavelength.

The invention further comprises a Fourier transform lens, a control reflector such as a CRT screen positioned such that the reflected beam from the reflector back though the lens is within the acceptance angle of the array, and a beam splitter positioned between the array and the control reflector for extracting a steered beam. In another aspect of the invention, the control reflector is an electronically addressable liquid crystal spatial light modulator.

In still another aspect of the invention, the array of phase conjugate mirrors may be arranged on the imaginary surface of a sphere in such a way that the center of the acceptance angle of each phase conjugate mirror points toward the center of the imaginary sphere.

The above-noted and other aspects of the present invention will become more apparent from a detailed description of preferred embodiments when read in conjunction with the drawings.

BRIEF DESCRIPTION OF THE DRAWINGS

The invention will further be described by reference to the accompanying drawings which illustrate particular embodiments of the invention, wherein like members bear like reference numerals and wherein:

FIG. 3 is a schematic diagram illustrating the system of FIG. 2 in which laser amplifiers, instead of the phase conjugate mirrors, amplify the incident wavefront;

FIG. 4 is a schematic diagram of the system of FIG. 1 in which an arcuate array of six phase conjugate mirrors is used;

DESCRIPTION OF A PREFERRED EMBODIMENT

Figure 1:
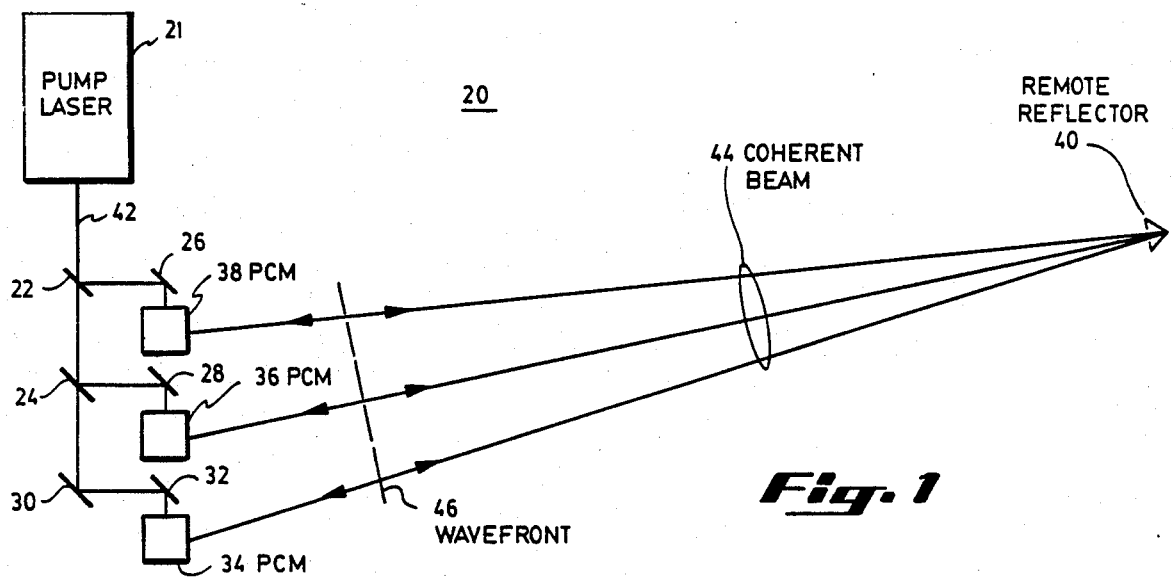
FIG. 1 is a schematic diagram illustrating a system according to the present invention in which each mirror in an array of closely packed phase conjugate mirrors provides amplification of the incident wavefront.

Referring to FIG. 1, a conjugating array 20 according to the present invention is illustrated. The conjugating array comprises a pump laser 21, two beam splitters 22, 24, four mirrors 26, 28, 30, 32, three phase conjugating mirrors, 34, 36, and 38, and a remote reflector 40. In the preferred embodiment, the phase conjugate mirrors 34, 36, 38 each have a gain of at least one hundred, such as the mirrors referred to in the article by Jack Feinberg and G. David Bacher, entitled "Phase-Locking Lasers with Phase Conjugation, in Applied Physics Letters", 48(9) Mar. 3, 1986. The phase conjugate mirrors 34, 36, and 38, are closely spaced, with only enough space between them to allow the beam 42 from the pump laser to reach and fill each phase conjugate mirror. This tight packing of the phase conjugate mirrors avoids "grating lobes" in the beam pattern.

The optical length of the resonator, formed between the remote reflector 40 and the conjugating array 20, measured along the line between the reflector 40 and the conjugating mirrors 34, 36, and 38, is chosen to be equal to the resonator length of the pump laser 21, or to a small integer multiple thereof, to assure coherence for grating formation in the phase conjugate mirrors. By thus removing the coherence length requirement on the pump laser, a wide choice of lasers for the pump laser is possible. High gain lasers such as Nd:YAG or dye lasers are compatible with phase conjugate mirrors made of barium titanate.

As an alternative embodiment, an etalon may be placed in the pump laser resonator to increase its coherence. The beam 44 produced by the phase conjugate mirrors is a coherent beam. The number of phase conjugate mirrors may be increased as needed to respond to any desired portion of the wavefront 46.

Figure 2:
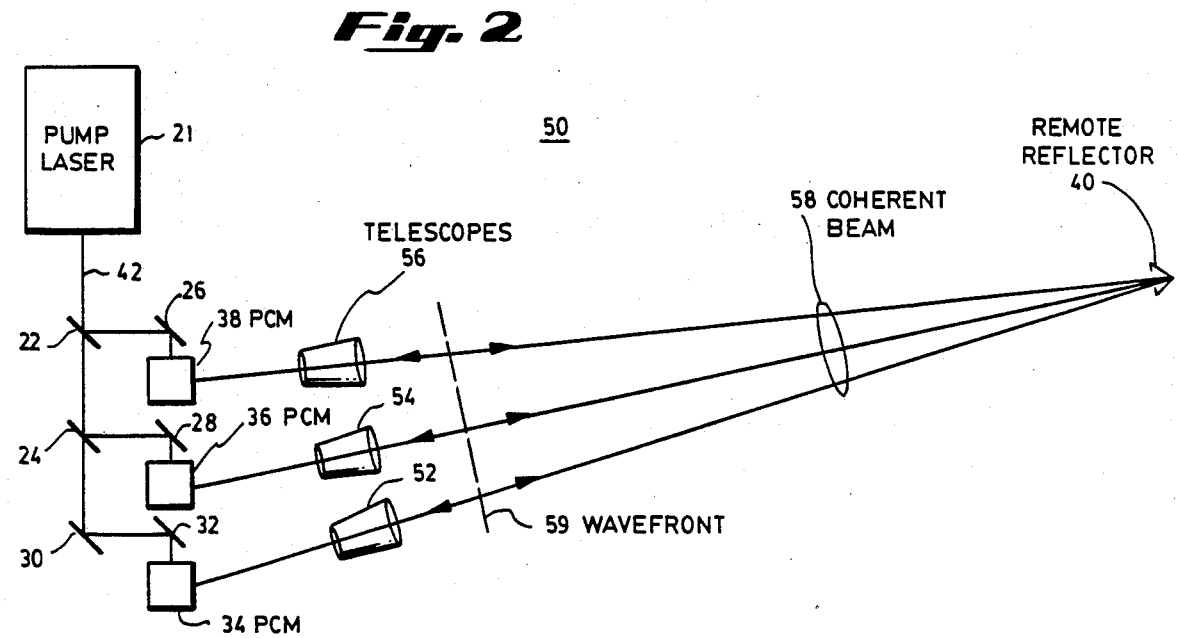
FIG. 2 is a schematic diagram of the system of FIG. 1 with the change that the mirrors are not closely packed, and telescopes are added to compensate for "grating lobes" that would otherwise appear in a loosely packed array.

Referring now to FIG. 2, a conjugating array 50 similar to the array 20 of FIG. 1 is illustrated with the change that afocal telescopes 52, 54, and 56 have been added as beam expanding means for increasing the diameter of the conjugate reflections from the conjugate mirrors 34, 36, and 38. The use of the telescopes allows the phase conjugate mirrors to be more loosely spaced and yet still avoid the problem of "grating lobes" in a coherent beam 58 between the telescopes and the remote reflector 40. Thus, a wavefront 59 will be substantially identical to the wavefront 46 produced by the device of FIG. 1, but restricted to a smaller acceptance angle or agile field-of-view.

Referring now to FIG. 3, a conjugating array 60 is illustrated which is similar to the array 50 of FIG. 2, with the addition of laser amplifiers 62a, 62b, and 62c. The laser amplifiers amplify a coherent beam 66 reflected by the phase conjugate mirrors 34, 36, and 38. Thus, for the phase conjugate mirrors in the array 60, the mirrors do not have to have a gain of one hundred, but rather can have a gain less than unity, since the laser amplifiers 62a, 62b, and 62c amplify the conjugate reflection. A wavefront 64 of the coherent beam 66 is substantially identical to the wavefront 59 of the coherent beam 58 produced by the array 50 of FIG. 2.

Referring now to FIG. 4, a conjugating array 70 similar to the array 20 of FIG. 1, but with three additional phase conjugate mirrors, is illustrated. Phase conjugate mirrors 72a, 72b, and 72c have been added. Also, beam splitters 74a, 74b, and 74c, and a mirror 76, have been added. Closely spacing all of the phase conjugate mirrors, and using an etalon at the output of the pump laser, allows the pump beam 42 to remain coherent throughout the distance to the farthest phase conjugate mirror 72a. The wavefront 78 is focused on the remote reflector 40.

The number of phase conjugate mirrors is not limited to three or six. Rather, the number of phase conjugate mirrors could be increased along the imaginary line of a circle as indicated by the arcs 79a and 79b until a complete circle is formed by the phase conjugate mirrors. Furthermore, in an alternate embodiment of the invention, many rings of phase conjugate mirrors may be used until the phase conjugate mirrors substantially cover the surface of an imaginary sphere, with all of their acceptance angles pointed toward the center of the sphere.

In yet another alternate embodiment of the invention, telescopes and laser amplifiers such as shown in FIG. 3 may be used in conjunction with each phase conjugate mirror on the imaginary surface of the sphere. It should be immediately obvious to one skilled in the art that a spherical configuration of an array of phase conjugate mirrors as described above is useful in concentrating a large amount of laser power on a single small object. Such an array has many applications, including nuclear fusion using deuterium pellets.

Figure 5:
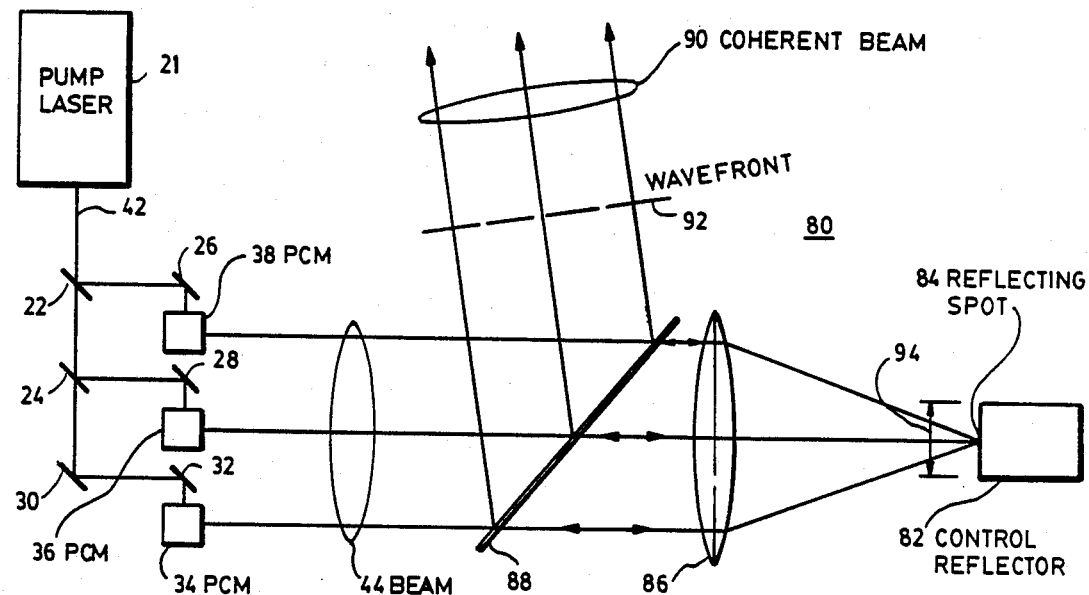
FIG. 5 is a schematic diagram illustrating the system of FIG. 1 with the additional components of a control reflector, a Fourier transform lens, and a steered beam extractor.

Referring now to FIG. 5, a steerable conjugating array is illustrated. The optics added to the device of FIG. 1 to produce the device illustrated in FIG. 5 may be described as one-half of a flat field conjugate scan laser resonator. Instead of using a remote reflector 40 as in FIGS. 1 through 4, a control reflector 82, as shown in FIG. 5, may be used for moving a reflecting spot 84 at which the beam 44 is focused. See U.S. Pat. No. 4,513,421, to Welch for a disclosure of a control reflector. A Fourier transform lens 86 focuses the beam 44 on the reflecting spot 84. A beam splitter 88, which may be called a master beam splitter, is located between the phase conjugate mirrors and the lens 86, but may also be located between the lens 86 and the control reflector 82 and produce a similar result. The beam splitter 88 is used to extract a coherent beam 90. As shown in FIG. 5, a wavefront 92 of the coherent beam 90 is a collimated beam. However, the beam 90 may be a converging beam to focus at any desired length, depending on the distance of the control reflector 82 from the lens 86.

Figure 6:
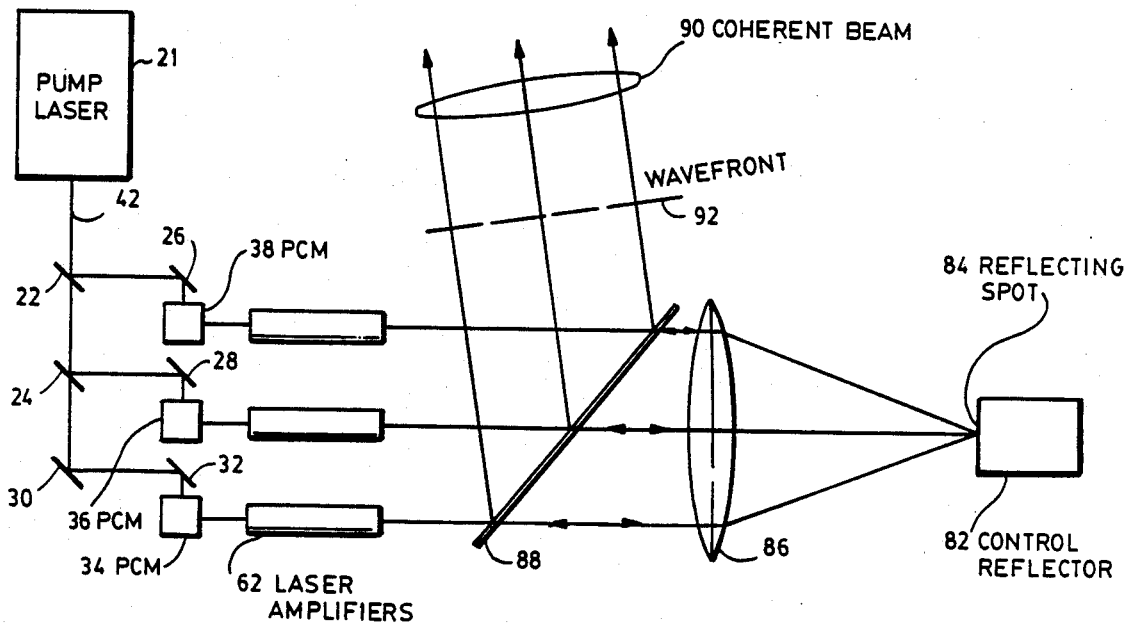
FIG. 6 is a schematic diagram illustrating the system of FIG. 5 in which laser amplifiers, instead of the phase conjugate mirrors, are used to provide amplification of the incident wavefront.

By increasing the number of phase conjugate mirrors, the reflecting spot 84 may be moved through a greater distance 94. In one embodiment of the invention, the control reflector 82 is a cathode ray tube, and thus a reflecting spot 84 is a spot on the screen of the cathode ray tube. However, in the preferred embodiment of the invention, the control reflector 82 is an electronically addressable liquid crystal spatial light modulator and mirror, such as the type commonly used in pocket-sized television receivers. Referring now to FIG. 6, the laser amplifiers 62a, 62b, and 62c may be added to the steerable conjugating array of FIG. 5 for the same purposes as discussed in relation to FIG. 3.

The principles, preferred embodiments and modes of operation of the present invention have been described in the foregoing specification. The invention is not to be construed as limited to the particular forms disclosed, since these are regarded as illustrative rather than restrictive. Moreover, variations and changes may be made by those skilled in the art without departing from the spirit of the invention.

What is claimed is:

1. A system for steering a coherent wavefront of electromagnetic radiation, the system comprising:
   (a) pumping means capable of generating a monochromatic coherent beam having a wavelength substantially the same as the wavelength of the wavefront; and
   (b) a plurality of phase conjugate mirrors arrayed to be coherently pumped concomitantly by a beam from the pumping means and wherein:
   (1) the center of the acceptance angle of each phase conjugate mirror, for conjugate reflection of the wavefront, is pointing substantially at the same point in space, and
   (2) the phase conjugate mirrors are composed of material responsive to the beam wavelength.

2. The system of claim 1 wherein:
   (a) each phase conjugate mirror provides amplification of the wavefront upon reflection of the wavefront; and
   (b) the phase conjugate mirrors are positioned proximate to each other with only enough spacing between the mirrors to allow the beam from the pumping means to enter and fill each phase conjugate mirror.

3. The system of claim 1 further comprising for each phase conjugate mirror, an amplification means for amplifying the conjugate reflection.

4. The system of claim 3 further comprising for each phase conjugate mirror, beam expanding means for expanding the diameter of each conjugate reflection.

5. The system of claim 1 further comprising:
   (a) a Fourier transform lens positioned in the path of the conjugate reflected wavefront;
   (b) a movable control reflector positioned such that the wavefront passed by the lens is reflected back through the lens within the acceptance angle of the array; and
   (c) a beam splitter positioned between the array and the control reflector.

6. The system of claim 4 further comprising:
   (a) a Fourier transform lens positioned in the path of the conjugate reflected wavefront;
   (b) a moveable control reflector positioned such that the wavefront passed by the lens is reflected back through the lens within the acceptance angle of the array; and
   (c) a beam splitter positioned between the array and the control reflector.

7. The system of claim 5 wherein the control reflector comprises an electronically addressable liquid crystal spatial light modulator and mirror.

8. The system of claim 6 wherein the control reflector comprises an electronically addressable liquid crystal spatial light modulator and mirror.

9. The system of claim 7 or 8 wherein the pumping means comprises a pump laser resonator having a coherence means for increasing the coherence length of the beam.

10. Apparatus for generating a steerable monochromatic, coherent light beam which comprises:
    a pump laser capable of generating a coherent light beam;
    a moveable first reflector spaced from said laser capable of reflecting coherent light;
    a plurality of phase conjugate mirrors arrayed between said laser and said first, reflector, each mirror positioned to receiver, at the center of its acceptance angle concomitantly with each other mirror, a separate portion of the light beam generated by the laser and directing such portion to the first reflector.

11. The apparatus of claim 10 which further comprises a separate additional reflector for each phase conjugate mirror positioned between said pump laser and said array to reflect a separate portion of said light beam to the phase conjugate mirror corresponding to said additional reflector.

12. The apparatus of claim 11 in which additional reflectors for distal phase conjugate mirrors in the array are total reflectors and each other additional reflector comprises a beam splitter positioned to reflect a portion of the beam from the laser to its corresponding phase conjugate mirror and pass the remainder of the beam to the next more distal additional reflector in the array.

13. The apparatus of claim 11 or 12 further comprising a master beam splitter positioned between the array and said first reflector to direct a portion of the light traveling between the array and said first reflector in a direction away from said array and said first reflector.

14. The apparatus of claim 13 further comprising means to move said first reflector relative to said array.

15. The system of claim 1 wherein the same point on space is a movable control reflector.

* * * * *

UNITED STATES PATENT AND TRADEMARK OFFICE
CERTIFICATE OF CORRECTION

PATENT NO. : 4,831,333
DATED : May 16, 1989
INVENTOR(S) : Albert B. Welch

It is certified that error appears in the above-identified patent and that said Letters Patent is hereby corrected as shown below:

Column 6, line 26, delete the "," between "first" and "reflector".

Column 6, line 27, delete "receiver" and insert --receive--.

Column 6, line 52, delete "on" and insert --in--.

Signed and Sealed this

Twenty-eighth Day of November 1989

Attest:

JEFFREY M. SAMUELS

*Attesting Officer*   *Acting Commissioner of Patents and Trademarks*